Patented Oct. 7, 1952

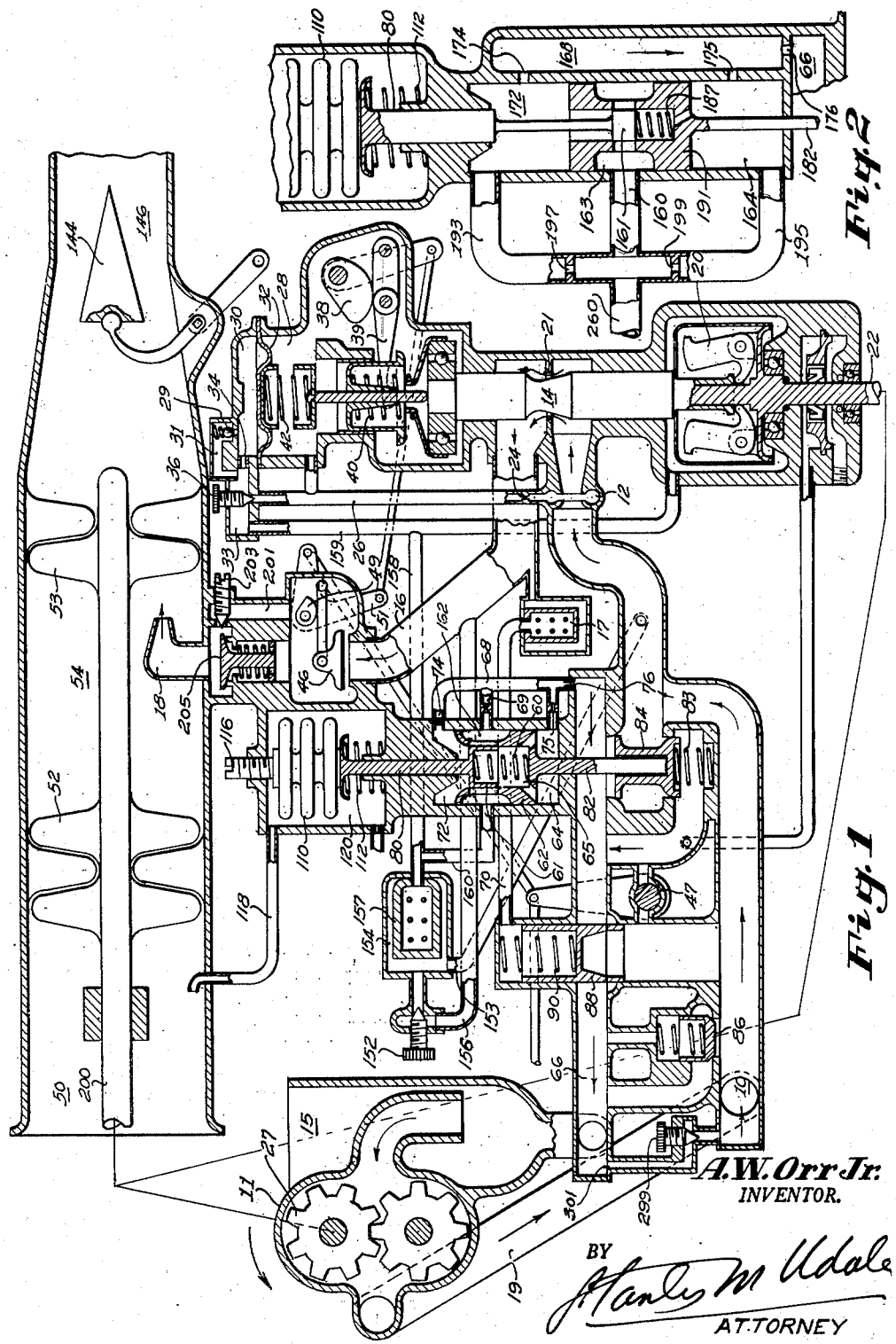

2,612,944

UNITED STATES PATENT OFFICE 2,612,944

SEMIISOCHRONOUS GOVERNOR FOR GAS TURBINES AUTOMATICALLY MODIFIED BY FUEL PRESSURE

Andrew William Orr, Jr., Detroit, Mich., assignor to George M. Holley and Earl Holley Application June 7, 1948, Serial No. 31,583

17 Claims. (Cl. 158—36.4)

1

The object of this invention is to correct the inherent defect in a centrifugal governor, loaded with a coil spring, at any given speed so as to impose stability and at the same time obtain the greatest accuracy of speed control, that is, with the minimum "droop."

Specifically, the object is to increase the fuel flow of a gas turbine gradually as the preselected speed is approached, however rapidly the load on the governing spring is increased, and to make this fuel increase so that the ultimate maximum speed attained is approximately the speed at which the governor cuts off the fuel. That is to say without any "overshooting" of the maximum speed.

Another object is to limit the fuel available during acceleration of a gas turbine, especially at altitude, but to avoid restricting the fuel as the speed approaches the governed speed to the point where the desired governed speed is not attained.

Fig. 1 is a diagrammatic view of the preferred form of my invention.

Fig. 2 shows an improved detail of the acceleration control.

Figure 3:
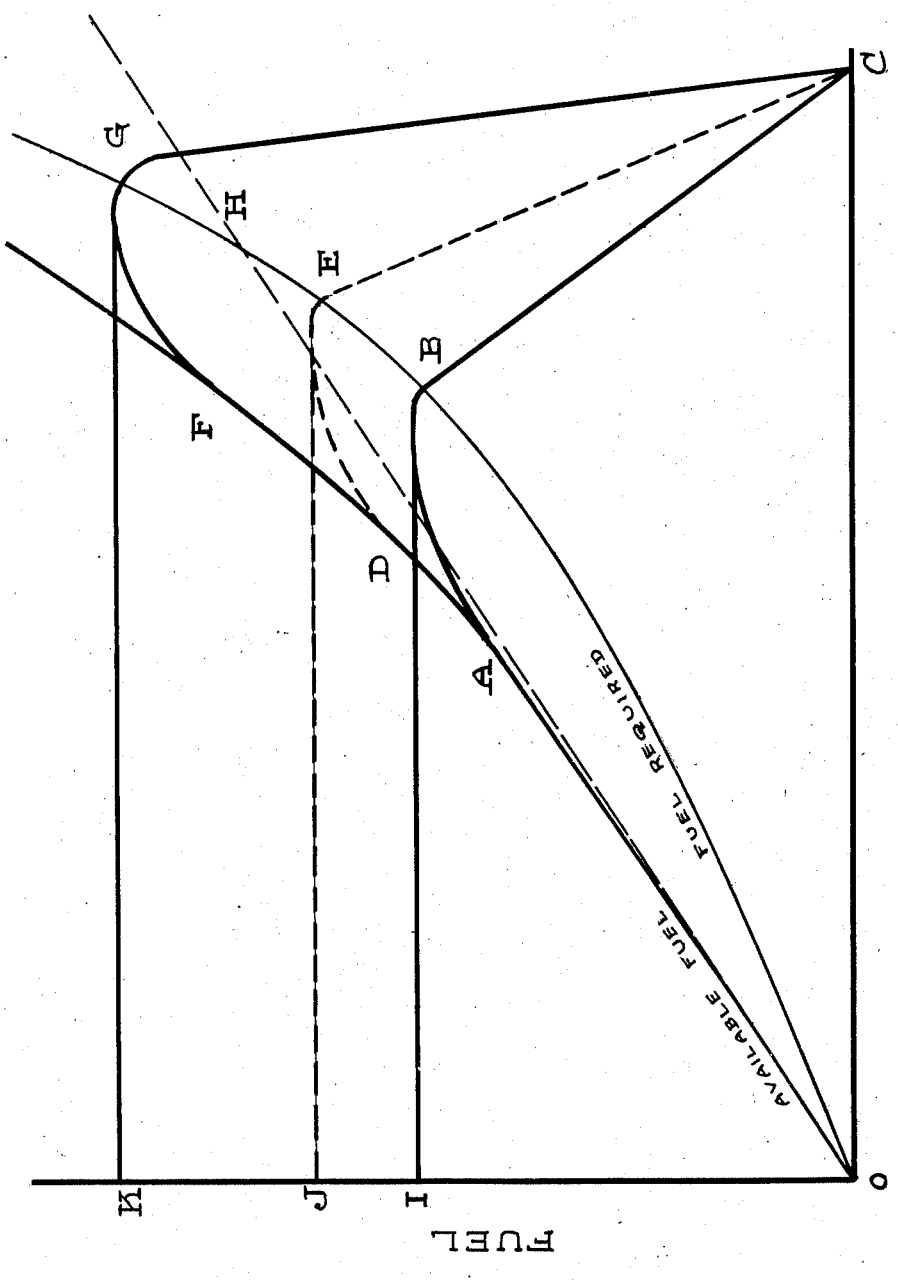
Fig. 3 shows the relationship between speed and fuel consumption.

In Fig. 1, 10 is the fuel entrance, 12 is a venturi in the fuel entrance, 14 is a governor controlled metering valve regulating the flow through the restriction 21 and along the passage 16 leading to the gas turbine nozzle 18. A spring loaded valve 205 and an adjustable bypass 201—205 controls the flow to the nozzle 18.

Fuel enters at fuel entrance 10 from a positive displacement pump 27 driven by the shaft 200 of a turbine 53. Fuel is supplied to the pump 27 from a tank 15. A return passage 66 is connected to this tank 15. A pipe 19 connects the pressure (outlet) side of the positive displacement pump 27 with the fuel entrance 10. The gas turbine governor comprises the centrifugal weights 20 which are driven by a shaft 22 which is also driven by the gas turbine 53. The movement of the weights 20 outwardly and of the valve 14 upwardly compresses the manually operated spring 40 and restricts the flow through the opening 21 and is opposed by diaphragm 32, a spring 42 and through the diaphragm by the decrease in pressure in the chamber 28 connected through the passage 26 to the throat of the venturi 12. When the valve 14 is moved down in the direction of an increased fuel flow by the anti-clockwise rotation of cam 38 and the lever 39 the flow increases and there is a corresponding decrease in the pressure in venturi 12.

2

The throat of the venturi 12 is connected through restriction 24 and passage 26 to the chamber 28. Chamber 30, above the diaphragm 32, is maintained at the pressure of the fuel entrance 10, through restriction 34 and passages 158 and 159, the fuel filter 157 and the inclined fuel passage 153. The restriction 24 and a valve adjustment 36 regulate "droop" by modifying the effect of the Venturi suction. When valve adjustment 36 is wide open the pressures above and below the diaphragm 32 are equal. When 36 is closed full suction of the venturi 12 acts on the diaphragm 32.

The loads on the centrifugal weights 20 are varied by the cam 38 and spring 40. Spring 42 and the low pressure in chamber 28 assist spring 40 in moving the valve 14 down towards the open position, just as the centrifugal weights 20 move the valve 14 up towards its closed position.

It is desirable to delay the effect of the venturi 12 so that the turbine is gradually brought up to the selected speed and this selected speed is not exceeded. This result is accomplished by the following means:

The movement of the diaphragm 32 in a downward direction is checked by a restriction 34. The return movement of the diaphragm 32 in an upward direction is facilitated by a spring loaded check valve 29. The spring loaded valve 29 is located in a bypass 31 which communicates with a chamber 33, which chamber 33 is maintained at the pressure in the fuel entrance 10. Hence, the diaphragm 32 is free to move up but is delayed in its downward movement. The valve 14 thus moves less freely down than it moves up to restrict the fuel flow.

These elements which control the speed of the governor and thus the speed of the turbine are associated with other elements of the complete gas turbine control as follows:

Specifically, a manually controlled shut-off valve 46 is used to shut all fuel off when stopping the engine. At the same time the valve 47 is opened to relieve the pressure in the fuel entrance 10. A cam 49 engages with a link, connected to the valve 46, and is moved by a bell crank lever 51 which is connected by suitable linkage with the cam 38 and the valve 47.

50 is the air entrance to the gas turbine 53 having a shaft 200. 52 is the turbine driven compressor delivering compressed air to the combustion chamber 54. A chamber 120 is in free communication with the air entrance 50, through the passage 118, and contains a temperature and pressure responsive evacuated bellows 110

(partially evacuated) which is adjusted by bolt 116. Spring 112 applied a constant upward pressure to bellows 110. When the element 110 expands at altitude, rod 80 descends and moves a servomotor piston valve 61 downwardly. The descent of the valve 61 causes the annular piston 62 to also descend because the descent of the valve 61 admits high pressure fuel to the upper side of the piston 62 from the chamber 154, passage 160 and annular chamber 162. The lower part of piston 62, in cylinder 64, is exposed to a lower pressure because it is connected to the low pressure in the pump return passage 66 through the restriction 75, passage 68 and restriction 76. The annular chamber 162, around the annular piston 62, is connected to the passage 68 through the restriction 69. The passage 68 connects the pressure in passage 66 with the chamber 72, above the piston 62, through the restrictions 74 and 76 in series.

The pressure in the passage 70, being connected through the filter 17, equals the pressure in the outlet passage 16 downstream from the regulating valve 14. The pressure in passage 16 is maintained below the pressure in the fuel entrance 10 by a constant amount by the valve 88, spring 90 and passage 70.

The extension 82, of the piston 62, pushes the balanced valve 84 down and compresses the spring 83 whenever the bellows 110 is sufficiently expanded. When the balanced valve 84 descends some of the fuel in entrance 10 is discharged into the low pressure fuel passage 66. The valve 84 is urged toward its seat by the light spring 83.

An emergency (600 pounds per square inch) pressure relief valve 86 is provided.

The usual manually controlled conical valve 144 is provided in the outlet 146 from the combustion chamber 54.

The fuel passage 156 is connected to the outlet passage 16. The low speed needle valve 152 admits fuel from the fuel filter chamber 154 to the low pressure fuel passage 156 bypassing fuel control valve 14. Chamber 154 is connected through the passage 153 to the fuel entrance passage 10. The fuel flows along the passage 153, through the chamber 154, through filter 157, through the passage 158, to the passage 159, to the chamber 33, and to the chamber containing the revolving weights 20.

The passage 301 connects the low pressure fuel passage 66 with passage 10, the high pressure fuel passage.

A manually adjustable valve 299 acts as a fine adjustment to the valve 84 and is effective at sea level in the regulation of the fuel available for acceleration.

At high altitudes, as valve 84 gradually opens, the percentage effect of valve 299 gradually ceases to be important and thus fades completely out of the picture.

*Description of Fig. 2*

This is a modification of the corresponding parts shown in Fig. 1 with the following changes:

The servomotor piston valve 161 is made the same diameter as the rod 80.

The rod 182 is now made smaller than the rod 80.

The bias on the partially evacuated element 110 is determined by the pressure exerted by the spring 112 and the pressure existing in the chamber 164, the area of the piston valve 161 and the stiffness of the spring 187.

The pressure in the chamber 164 is determined by the restriction 175 and the restriction 199 in the pipe 195 which connects the pipe 260 with the chamber 164 below the servomotor piston 191.

A corresponding pipe 193 is provided connecting the chamber 172 with the passage 260. A restriction 197, in the pipe 193 in conjunction with the restriction 174, determines the pressure in the chamber 172.

In Fig. 3 the horizontal line indicates revolutions per minute. The vertical line indicates fuel consumption in pounds per hour. The line OH is the straight line characteristic at a specific altitude of the discharge from the pump 27 with the valve 84 in a fixed position. The line OADF indicates the effect of the construction shown in Fig. 2 in modifying the fuel revolutions per minute characteristics of the pump 27-valve 84 combination. The slope of line OH declines with altitude. A restriction 176 in passage 168 corresponds to restriction 76 in passage 68 in Fig. 1.

*Operation of Fig. 1*

Assume steady running at a relatively slow speed. Assume that cam 38 is rotated anticlockwise. The load on the spring 40 is increased and the valve 14 is moved down causing an increase in fuel flow and a drop in pressure in the venturi 12.

The centrifugal governor acts at the speed when the centrifugal force of the centrifugal weights 20 overcome the force of the spring 40.

When the valve 14 first moves up, to restrict the fuel flow through the passage 16, the flow through the venturi 12 decreases and the pressure in the chamber 28 increases. However, due to the restriction 34, the diaphragm 32 does not follow immediately. Ultimately the increase in pressure in chamber 28 causes the valve 14 to move up slightly to check the speed so that the speed is checked by the combined action of centrifugal weights 20 and the venturi 12 acting in the same direction to cause a rapid decrease in fuel for a slight increase in revolutions per minute.

At altitude the bellows 110 opens and moves the cylindrical valve 61 downwards. To whatever point the valve 61 moves to that same point moves the piston 62. This is the well known servomotor mechanism now in almost universal use. As the piston 62 descends the balanced valve 84 opens and determines the slope of the line OH (Fig. 3).

When the valve 84 is partly open, at altitude, the flow of fuel from the positive displacement pump 27 is, to a certain degree, bypassed by this valve 84. Hence, there is a limit to the amount of fuel that can be delivered per second during acceleration before the governor has a chance to restrict the fuel flow. During this period the fact that the valve 84 is partly open prevents the turbine 53 from becoming overheated during acceleration.

*Operation of Fig. 2*

As the area of 182 is much smaller than the area of rod 80 there is an upward force acting on the rod 80 equal to the pressure in chamber 164. This pressure has a tendency at high speed to permit the balanced valve 84 to close slightly. This tendency of the valve 84 to close raises the quantity discharged at nozzle 18 slightly at high speed. The centrifugally controlled valve 14 will then always cut off the fuel at the speed selected by the cam 38. Without this action of rod 80 on the valve 84 a situation arises where the speed of the turbine is checked by the capacity of the pump 27 below its governor selected speed. In that event the acceleration control means 84 interferes with the action of the centrifugal governor. The acceleration control means (110 etc.) is arranged so that it can never interfere and no excessive fuel will ever be supplied during acceleration. This is explained under Operation of Fig. 3. The curved line OADF (Fig. 3) is the result of the modification shown in Fig. 2.

*Operation of Fig. 3 (Referring to Fig. 2)*

The line ABC represents the characteristics of the centrifugal governor control of fuel flow when the valve 36 is wide open. This gives the maximum droop BC. When valve 36 is partly closed the characteristic DEC results. As the valve 36 is closed still more the characteristic FGC results which is almost isochronous.

The flow through the restriction 21, past the valve 14 is determined by the pressure drop. This pressure drop is limited by the valve 88 and its spring 90. Hence, at any given position of valve 14 a maximum constant flow, shown by the horizontal IBJE and KG, is possible. Actually such a flow only results after these horizontal lines have crossed the available fuel line ADF. This curve ADF is determined by the characteristics of pump 27 and the elements controlling the valve 84 (Fig. 2).

The line OBEHG represents the requirement of the gas turbine. It is noted that an increase in fuel always increases the power developed. If the construction shown in Fig. 2 is not used the available fuel follows the broken straight line such as OH. The intersection of the curve BEHG with the straight line OH at point H indicates that an interference with the governor action by the inherent characteristics of the gas turbine will then occur. This would cause excessive "droop." The area OBEHGFDAO represents the fuel available for acceleration which is increased by the area OADFGHO by the construction shown in Fig. 2 as compared with the construction shown in Fig. 1.

The lines BC, EC, GC, represent three different "droops" with the valve 36 progressively closed and the cam 38 rotated slowly counter-clockwise.

If cam 38 is rotated quickly then whatever the setting of the valve 36 the "droop" curve BC will first be followed for a short period of time, then EC will be followed and finally GC, assuming the valve 36 is almost closed. The gas turbine is gradually brought up to the selected speed by reason of the check valve 29 regardless of how quickly the cam 38 is rotated. When cam 38 is rotated clockwise at a rapid rate (deceleration) then the check valve 29 permits the control valve 14 to close rapidly so that the diaphragm 32 can then rise rapidly. Hence, during acceleration the valve 14 is first opened by the manually controlled spring 40 and later on by the automatically controlled spring 42.

What I claim is:

1. A centrifugal governor for a prime mover, said governor being adapted to create a force proportional to the speed squared, yieldable means opposing said force, a valve controlled by said governor so as to be closed by the centrifugal force and to be opened by said yieldable means, a passage in which said valve is located, a venturi in said passage, a source of motive fluid for said prime mover under pressure and connected to said passage to cause motive fluid to flow past valve and through said venturi to said prime mover, a chamber, a moving wall dividing the chamber into two parts, a connection from one side of the diaphragm to the low pressure in the throat of the venturi, a passage connecting the other side of the diaphragm to the normal pressure of the motive fluid flowing through said passage, a connection from the diaphragm to said valve whereby the pressure difference created by said venturi acting on said moving wall assists said yieldable means and opposes said centrifugal force and so tends to move said valve towards the open position so that the valve is closed at the critical speed both by centrifugal force and by the effect of decreased flow of motive fluid.

2. A gas turbine having a combustion chamber, a fuel control device comprising a fuel pump driven by said turbine and having a constant displacement per revolution of the turbine, an outlet passage from said pump, a control valve therein, control means therefor, an outlet from said control valve leading to the combustion chamber, a pressure release bypass leading from the pressure side of said control valve to the low pressure inlet passage leading to said pump, a pressure responsive valve therein adapted to be closed by the pressure downstream of said control valve and to be opened by the pressure upstream of said control valve so as to maintain normally a substantially constant pressure drop at said control valve, a second bypass from said pressure side to said pump inlet, a balanced pressure relief valve therein, barometric control means therefor adapted to open said valve at altitude, a centrifugal governor driven by said turbine and adapted to close said control valve and yieldable means adapted to open said control valve against the force of said centrifugal governor.

3. A device as set forth in claim 2 having means responsive to the speed of the turbine to close said balanced valve slightly at high turbine speeds.

4. A device as set forth in claim 2 in which there is a venturi in the outlet fuel passage in series with said control valve, a moving wall, a chamber enclosing said moving wall and divided into two parts thereby, said two parts being connected to said venturi by two passages one to the low pressure in the throat of said venturi and the other to the normal fuel pressure in said fuel passage so that the moving wall is responsive to the drop in pressure in the throat of said venturi, a connection from the movable wall to said control valve so as to tend to open said control valve slightly at high fuel flows.

5. A gas turbine having a combustion chamber, a fuel control device comprising a fuel supply pump driven by said gas turbine and having a constant displacement per revolution of the turbine, an outlet passage from said pump, a venturi and a control valve in series located in said outlet passage, speed responsive means of the centrifugal type adapted to close said control valve at high speeds, yieldable means adapted to oppose said speed responsive means and to open said control valve, a moving wall, a chamber enclosing said wall and divided thereby into two halves, a connection from each side of said diaphragm one to the low pressure in the throat of said venturi and the other to the normal pressure in said supply passage, a connection from said movable wall to said control valve to oppose the centrifugal force of said speed responsive means, a passage downstream from said control valve leading to said gas turbine combustion chamber, a return passage to said supply pump, a bypass leading from said outlet passage to said return passage located upstream from said venturi, a pressure response valve in said passage, means responsive to the pressure drop at said control valve to open said valve, yieldable means to close said valve so as to maintain a substantially constant pressure drop at said control valve.

6. A device as set forth in claim 5 in which there is a second bypass, a balanced valve located in said second bypass leading from the outlet passage to the return passage also located upstream of said venturi and of said control valve, barometric means for opening said second valve at altitude.

7. A device as set forth in claim 5 in which there is a second bypass, a balanced valve located in said second bypass leading from the outlet passage to the return passage also located upstream of said venturi and of said control valve, temperature responsive and barometric means for opening said second valve at high temperatures and altitude.

8. A device as set forth in claim 5 in which there is a restriction in one of the passages connecting the chamber enclosing said moving wall to delay the response of said moving wall to a sudden opening movement of the control valve.

9. A device as set forth in claim 5 in which there is a second bypass leading from the outlet passage to the return passage also located upstream of said venturi, a balanced valve located in said second bypass, temperature responsive and barometric means for opening said balanced valve at altitude, second speed responsive means for slightly closing said balanced valve at high turbine speed.

10. In combination with a prime mover, a source of motive fluid under pressure, a motive fluid passage, a supply valve for said prime mover in said passage, a venturi therein, a chamber, a diaphragm dividing the chamber into two parts, a pressure chamber and a suction chamber, a restricted passage connecting the pressure side of said venturi to the pressure chamber, an unrestricted passage in parallel with the first mentioned restricted passage, a check valve therein permitting the diaphragm to move freely in the direction of reducing the volume of the chamber on the pressure side of the diaphragm and less freely in the other direction, a passage connecting the suction chamber to the throat of said venturi, yieldable means for opening said supply valve, a speed responsive governor of the centrifugal type driven by said engine and connected to said supply valve to impose a closing force on said supply valve, a yieldable connection from said diaphragm to said supply valve to open said supply valve in response to the drop in pressure in the throat of said venturi.

11. In a speed responsive governor of the centrifugal type for a prime mover operated by a motive fluid, a supply of motive fluid under pressure, a passage for said fluid, a first restriction in said passage, a second restriction in said passage, a contoured throttle in said second restriction, said governor being connected to said throttle to close said second restriction at high speeds, manually controlled yieldable means connected to said throttle and opposed to the action of the governor so as to open the throttle, automatic flow responsive means responsive to the drop in pressure of the motive fluid in said passage at said first restriction, a yieldable connection from said automatic means to said throttle so as to open it so that an increase in flow of motive fluid tends to assist the manually controlled yieldable means in opening the throttle, hydraulic snubbing means associated with the automatic means during acceleration so as to delay the action of the automatic means and to be inoperative to permit the automatic means to act freely during deceleration when reducing the flow of fluid.

12. A semi-isochronous governor for a gas turbine and the like comprising a plurality of rotating weights, a spring opposing the centrifugal force of said weights, a source of motive fluid for said gas turbine under pressure, a main passage therefor, a venturi therein, a control valve to control the flow through said venturi, a chamber, a moving wall therein dividing said chamber into two parts, a passage from one part to the low pressure in the throat of said venturi, a passage from the other part to the normal pressure in said main fluid passage, a yieldable connection from said moving wall to said control valve to move said valve into its open position, a second connection from said valve to said governor whereby the difference between the centrifugal force and its opposing spring moves the valve toward its closed position, and manually operated means for increasing the opposing spring force, a check valve in the passage applying normal pressure to said moving wall, said check valve adapted to open freely when the flow through the venturi is being reduced by a reduction in the opposing spring force and to be closed whenever the flow through the venturi is being increased by an increase in the opposing spring force, a restricted bypass around said check valve.

13. A semi-isochronous governor for a gas turbine and the like comprising a plurality of rotating weights, a spring opposing the centrifugal force of said weights, a source of motive fluid for said gas turbine under pressure, a main passage therefor, a venturi therein, a control valve to control the flow through said venturi, a chamber, a moving wall therein dividing said chamber into two parts, a passage from one part to the low pressure in the throat of said venturi, a passage from the other part to the normal pressure in said main fluid passage, a yieldable connection from said moving wall to said control valve to move said valve into its open position, a second connection from said valve to said governor whereby the difference between the centrifugal force and its opposing spring moves the valve toward its closed position, and a restriction in the passage applying venturi suction to the chamber adjacent said moving wall, a second passage leading from said low pressure side of said moving wall to the normal pressure in said main fluid passage and a manually adjustable valve in said second passage to modify the suction effect of flow through said venturi on said moving wall.

14. A centrifugal governor for a gas turbine and the like, a manually controlled spring opposing the centrifugal force derived from said governor, a control valve jointly controlled by said opposing forces, a source of motive fluid for said gas turbine, a main fluid passage therefor, said control valve being located in said main fluid passage to control the flow therethrough, a moving wall, a chamber enclosing said moving wall and divided thereby into two parts, a restriction in said passage, a pressure passage connecting the pressure side of said moving wall with the pressure in the main fluid passage, a low pressure passage connecting the low pressure side of said moving wall with the low pressure created by said restriction, the moving wall thus forming a fluid flow responsive means, a connection from the moving wall to said valve so that the motion of moving wall opposes the motion due to centrifugal force as the speed of the gas turbine and the velocity of the flow of said motive fluid are both increased and a spring interposed between the moving wall of the flow responsive means and the fuel valve.

15. A centrifugal governor for a gas turbine and the like, a manually controlled spring opposing the centrifugal force derived from said governor, a control valve jointly controlled by said opposing forces, a source of motive fluid for said gas-turbine, a main fluid passage therefor, said control valve being located in said main fluid passage to control the flow therethrough, a moving wall, a chamber enclosing said moving wall and divided thereby into two parts, a restriction in said passage, a pressure passage connecting the pressure side of said moving wall with the pressure in the main fluid passage, a low pressure passage connecting the low pressure side of said moving wall with the low pressure created by said restriction, the moving wall thus forming a fluid flow responsive means, a connection from the moving wall to said valve so that the motion of moving wall opposes the motion due to centrifugal force as the speed of the gas turbine and the velocity of the flow of said motive fluid are both increased, and a spring interposed between the moving wall of the flow responsive means and the control valve and there is a one way valve in the wall on the pressure side of the chamber of said moving wall so as to prevent the immediate response of the moving wall to an increase in the opening motion of the control valve due to the increase in the manually controlled spring force opposing said centrifugal force and to an increase in velocity of flow of said motive fluid.

16. A centrifugal governor for a gas turbine and the like, a manually controlled spring opposing the centrifugal force derived from said governor, a control valve jointly controlled by said opposing forces, a source of motive fluid for said gas turbine, a main fluid passage therefor, said control valve being located in said main fluid passage to control the flow therethrough, a moving wall, a chamber enclosing said moving wall and divided thereby into two parts, a restriction in said passage, a pressure passage connecting the pressure side of said moving wall with the pressure in the main fluid passage, a low pressure passage connecting the low pressure side of said moving wall with the low pressure created by said restriction, the moving wall thus forming a fluid flow responsive means, a connection from the moving wall to said valve so that the motion of moving wall opposes the motion due to centrifugal force as the speed of the gas turbine and the velocity of the flow of said motive fluid are both increased and a restriction in the passage leading to the chamber on the low pressure side of said moving wall and a manually adjusted valve admitting higher pressure to the said low pressure side so as to control the influence of the flow responsive means on speed regulation.

17. A prime mover, a passage, a source of motive fluid for said prime mover under pressure connected to said passage to cause motive fluid to flow therethrough, a valve in said passage, a centrifugal governor for said prime mover connected to said valve, a manually controlled spring opposing the centrifugal force of said governor, flow responsive means responsive to the flow in said passage, a second spring interposed between said flow responsive means and said valve so that the flow responsive means imposes through said second spring, a second opposition force to said centrifugal force increasing as the square of the velocity of flow through said passage.

ANDREW WILLIAM ORR, Jr.

REFERENCES CITED

The following references are of record in the file of this patent:

UNITED STATES PATENTS

| Number | Name | Date |
|---|---|---|
| 2,374,844 | Stokes | May 1, 1945 |
| 2,422,808 | Stokes | June 24, 1947 |
| 2,438,663 | Greenland | Mar. 30, 1948 |
| 2,531,780 | Mock | Nov. 28, 1950 |

FOREIGN PATENTS

| Number | Country | Date |
|---|---|---|
| 429,682 | Great Britain | June 4, 1935 |